DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 31, 1971

889 O.G. 1367

T889,023
ELECTROPHOTOGRAPHIC COMPOSITION AND ELEMENTS

George A. Reynolds and James A. Van Allan, Kodak Park Works, Rochester, N.Y. 14650

Filed Oct. 5, 1970, Ser. No. 78,613
Int. Cl. G03g *5/00, 7/00*
U.S. Cl. 96—1.6
No Drawing. 37 Pages Specification

Benzo[b]pyrylium salts and benzo[b]thiapyrylium salts of the formula

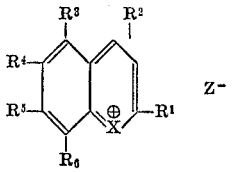

are sensitizers for photoconductors wherein $R^1$, $R^2$, $R^3$, $R^4$, $R^5$, and $R^6$ may represent separate moieties including amono- or polycyclic, heterocyclylidenemethyl radical wherein; when taken together, any two of $R^3$, $R^4$, $R^5$, and $R^6$ attached to adjacent carbon atoms represent the atoms necessary to form a fused ring; and wherein X is a hetero atom, e.g. oxygen or sulfur.